United States Patent
Lee

[11] Patent Number: 5,865,879
[45] Date of Patent: Feb. 2, 1999

[54] GAS SCRUBBER USED IN FABRICATING SEMICONDUCTOR DEVICES AND GAS FILTERING METHOD USING THE SAME

[75] Inventor: Ye-seung Lee, Seoul, Rep. of Korea

[73] Assignee: Samsung Electronics Co., Ltd., Suwon, Rep. of Korea

[21] Appl. No.: 770,439

[22] Filed: Dec. 20, 1996

[30] Foreign Application Priority Data

Dec. 22, 1995 [KR] Rep. of Korea .................. 1995-54713

[51] Int. Cl.[6] .................................. B01D 46/02
[52] U.S. Cl. ................ 95/273; 55/300; 55/302; 55/379; 55/492; 55/499; 55/502
[58] Field of Search ............................ 55/492, 496, 501, 55/508, 379–378, 499, 293, 300, 302, 498; 95/273

[56] References Cited

U.S. PATENT DOCUMENTS

| | | | |
|---|---|---|---|
| 1,079,586 | 11/1913 | Yeomans | 55/379 |
| 1,109,372 | 9/1914 | Thurman | 55/379 |
| 1,176,721 | 3/1916 | Zimmer | 55/379 |
| 1,218,975 | 3/1917 | Brison | 55/379 |
| 1,321,715 | 11/1919 | Chaney | 55/379 |
| 1,847,368 | 3/1932 | Wendler | 55/379 |
| 2,390,841 | 12/1945 | Longden | 55/492 |
| 2,496,180 | 1/1950 | Smith | 55/379 |
| 2,814,357 | 11/1957 | Bowman | 55/379 |
| 3,568,413 | 3/1971 | Jerabek | 55/379 |
| 3,830,042 | 8/1974 | Macdonnell | 55/379 |
| 3,884,659 | 5/1975 | Ray | 55/492 |
| 3,938,971 | 2/1976 | McClure | 55/300 |
| 4,014,672 | 3/1977 | Jansson | 55/379 |
| 4,058,379 | 11/1977 | Cheng | 55/492 |
| 4,073,632 | 2/1978 | Reinauer et al. | 55/379 |
| 4,266,954 | 5/1981 | Oare et al. | 55/379 |
| 4,383,840 | 5/1983 | Jones | 55/300 |
| 4,531,258 | 7/1985 | Spellman | 55/379 |
| 4,588,426 | 5/1986 | Virgile et al. | 55/492 |
| 5,223,134 | 6/1993 | Riva | 55/379 |
| 5,322,534 | 6/1994 | Kaiser | 55/378 |
| 5,507,859 | 4/1996 | Kaiser | 55/378 |

FOREIGN PATENT DOCUMENTS

| | | | |
|---|---|---|---|
| 3-143516 | 6/1991 | Japan | 55/379 |

*Primary Examiner*—Duane S. Smith
*Attorney, Agent, or Firm*—Jones & Volentine, L.L.P.

[57] ABSTRACT

A gas scrubber used in fabricating semiconductor devices and a filtering method using the same are provided. The gas scrubber contains a flange having an inlet on the upper surface thereof, a hollow housing combined at one end with the outer circumferential surface of the flange, a cup-shaped filter housed inside the hollow housing, for filtering impurities flowing through the inlet, and pillar type filter supporters mounted on the lower surface of the flange, for maintaining the shape of the filter. Here, powders to be filtered are filtered by passing from the exterior of the filter to the interior thereof and the shape of the filter is maintained by the pillar type filter supporters. Thus, the life of the filter can be prolonged so that the costs of manufacturing a semiconductor device are reduced.

11 Claims, 4 Drawing Sheets

GAS SCRUBBER USED IN FABRICATING SEMICONDUCTOR DEVICES AND GAS FILTERING METHOD USING THE SAME

BACKGROUND OF THE INVENTION

The present invention relates to a gas scrubber used in fabricating semiconductor devices for scrubbing used gases and a gas filtering method using the same.

In general, chemical gases are used in various processes such as thermal treatment, thin-film formation and etching for fabricating semiconductor devices. The gases used in these processes are scrubbed through several steps and then recycled.

FIG. 1 is a schematic diagram showing a typical gas scrubber for a semiconductor device, and particularly, a gas scrubber for scrubbing silane ($SiH_4$) gas. In FIG. 1, reference numeral 1 denotes a used gas inlet, reference numeral 3 denotes an air inlet, reference numerals 5, 7 and 9 denote first, second and third gas lines, reference numeral 14 denotes a filtering portion, reference numeral 16 denotes a catalytic reaction chamber, reference numeral 18 denotes a blower, and reference numeral 20 denotes a check valve.

The used gas which is to be scrubbed, i.e., silane ($SiH_4$), entering via the used gas inlet 1 produces a silicone dioxide powder and vapor by reacting with the air entering via the air inlet 3: $SiH_4+2O_2 \rightarrow SiO_2+2H_2O$. The $SiO_2$ powder is removed by the filtering portion 14. Then, the unreacted used gas flows into the catalytic reaction chamber 16 through the first gas line 5 and is then reprocessed by a catalytic solution. Thereafter, the gas scrubbed by the filtering portion 14 or catalytic reaction chamber 16 passes through the second gas line 7, for output through third gas line 9. The blower 18 is installed to prevent pressure loss caused when the filtering portion 14 become blocked by the powder.

In the gas scrubber, the durability of the gas scrubber is directly related to that of the filtering portion 14. Accordingly, increasing the life span of the filtering portion 14 will reduce the cost of a gas scrubber used in fabricating semiconductor devices.

FIG. 2 is an exploded perspective view of the filtering portion of the conventional gas scrubber. Here, reference numeral 20 denotes a flange, reference numeral 22 denotes a first gas inlet, reference numeral 24 denotes a second gas inlet, reference numeral 30 denotes a sealing ring, reference numeral 32 denotes a clamp, reference numeral 40 denotes a filter having an inlet A, and reference numeral 50 denotes a hollow housing.

The filtering portion of the conventional gas scrubber is comprised of the flange 20 having first and second gas inlets 22 and 24 installed on the upper and lower surfaces thereof, respectively, the hollow housing 50 combined at one end with the outer circumferential surface of the flange 20, and a filter 40 housed in the hollow housing 50 and fixed to the second gas inlet 24 by the clamp 32.

Here, the hollow housing 50 is used for protecting the filter 40 from being damaged by an external impact. The sealing ring 30 is inserted between the flange 20 and the hollow housing 50 to fix the former to the latter, thereby buffering impacts generated at the contact surface between the flange 20 and the hollow housing 50 and preventing the leakage of the gas introduced into the filter 40.

The powder and vapor which are generated by the reaction of the used gas with air, and the remaining non-reacted used gas pass through the flange 20 via the first gas inlet 22, flow into the filter 40 through the second gas inlet 24, and then flow out of the filter 40 as indicated by the arrows of FIG. 2. At this time, the vapor, and the remaining non-reacted used gas penetrate through the filter 40, but the powder is collected at the inner walls of the filter 40. Accordingly, in the conventional gas scrubber, the life span of the filtering portion is shortened due to the following problems.

First, since the filter 40 must be fixed to the second gas inlet 24, it is inherent that the filter inlet A is the narrowest portion of the filter itself. Accordingly, during filtering, the filter inlet becomes partially blocked with powder which accumulates on the inner walls of the filter. This phenomenon is the main cause of the life reduction of a filter since the accumulation of powder at the filter inlet requires exchange of a whole filter despite the fact that the other portions thereof are free of powder build up.

Second, in the conventional device, the filtered powder collects on the filter's inner wall, which has an adverse effect on the life of a filter. That is, if the filtered powders were collected on the outer wall of the filter 40, the accumulation of powder could be eliminated, simply by periodically jarring the exterior wall. Here, it should be appreciated that interior powder accumulation is difficult to remove and results in early filter replacement.

Third, the shape of the filter 40 becomes distorted when it is loaded into the hollow housing 50, such that the effective surface area for filtering is reduced. Since the durability of a filter is directly proportional to the surface area where powder may accumulate, if this area is increased, the life of the filtering portion is prolonged.

SUMMARY OF THE INVENTION

It is an object of the present invention to provide a gas scrubber used in fabricating a semiconductor device which uses a filtering portion whose filter can be used for a long time without replacement.

It is another object of the present invention to provide a filtering method using the gas scrubber having the filtering portion whose filter can be used for a long time without being replaced.

To accomplish the first object, according to an embodiment of the present invention, there is provided a gas scrubber used in fabricating semiconductor devices comprising a flange having an inlet on the upper surface thereof, a hollow housing combined at one end with the outer circumferential surface of the flange, a cup-shaped filter housed inside the hollow housing, for filtering impurities flowing through the inlet, and pillar type filter supporters mounted on the lower surface of the flange, for maintaining the shape of the filter.

It is preferable that a sealing ring, provided between the flange and the hollow housing, for preventing leakage of impurity therebetween and a clamp for fixing the filter to the pillar type filter supporters are provided. Here, the impurity is used gases and powders generated by the reation of the used gases with air.

To accomplish the first object, according to another embodiment of the present invention, there is provided a gas scrubber used in fabricating semiconductor devices comprising a first flange having a gas inlet on the upper surface thereof, a hollow housing combined at one end with the outer circumferential surface of the first flange, a second flange whose outer circumferential surface is combined with the other end of the hollow housing, a cap-shaped filter housed inside the hollow housing, for filtering impurities flowing through the inlet, and pillar type filter supporters mounted on the upper surface of the second flange, for maintaining the shape of the filter.

It is preferable that a sealing ring, provided between the first flange and the hollow housing, for preventing leakage of impurity therebetween and a clamp for fixing the filter to the pillar type filter supporters are provided. Here, the impurity is used gases and powders generated by the reaction of the used gases with air.

Also, it is preferable that a vibrator for vibrating the filter or a nitrogen purger for providing nitrogen pressure into the filter is provided as a powder removing means, installed within the hollow housing, for removing powders accumulated on the outer surface of the filter.

To accomplish the second object, there is provided a gas filtering method comprising the steps of flowing impurity into a hollow housing, and filtering the impurity by passing the same from the exterior of the cap-shaped filter to the interior thereof.

Therefore, according to the gas scrubber of the present invention and the gas filtering method using the same, the life span of the filter can be lengthened. Consequently, the cost for manufacturing semiconductor devices can be reduced.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
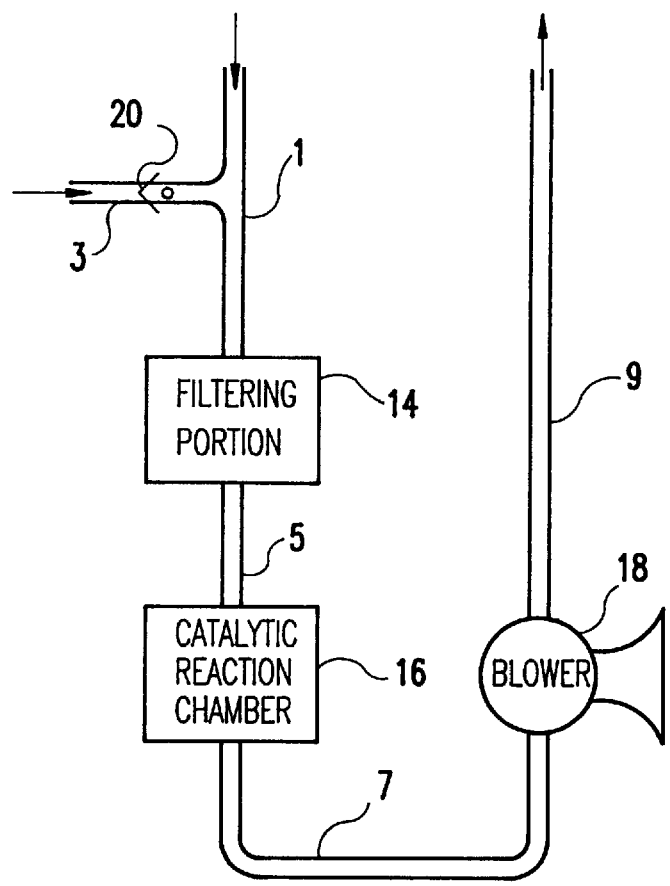
FIG. 1 is a schematic diagram showing a conventional gas scrubber of a semiconductor device.
Figure 2:
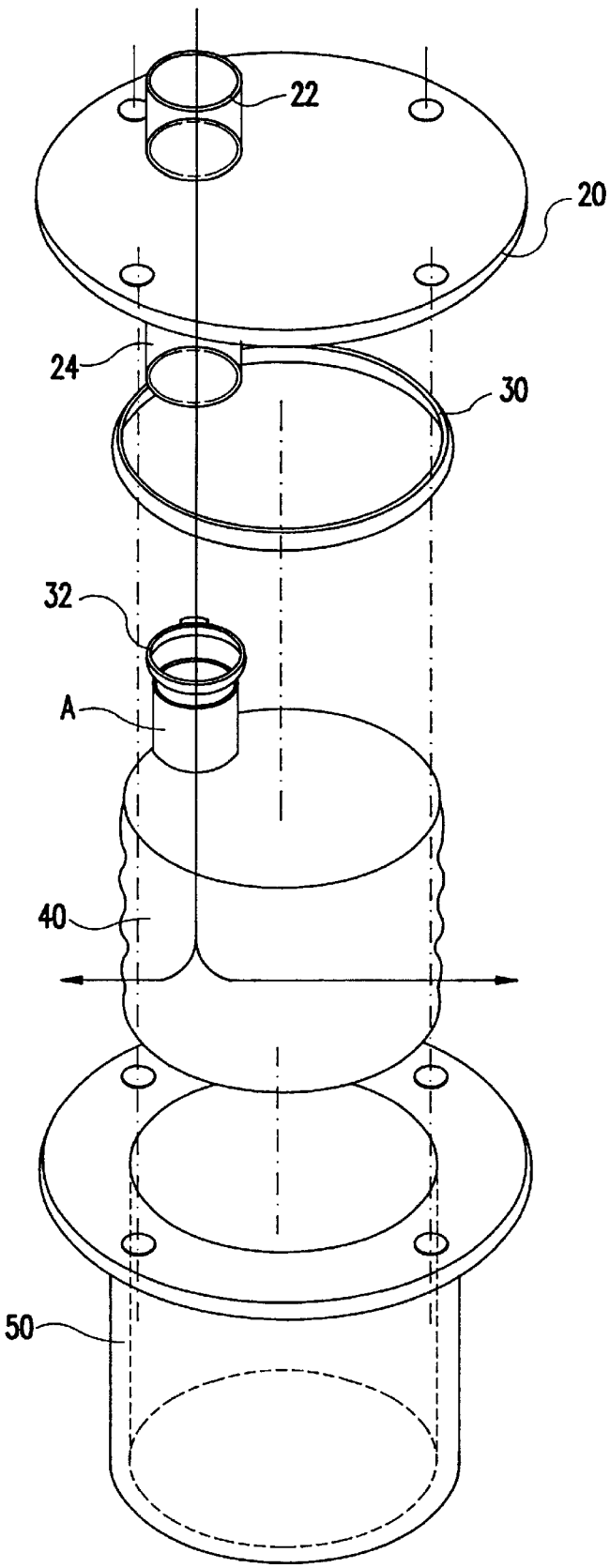
FIG. 2 is an exploded perspective view of a filtering portion of the conventional gas scrubber.
Figure 3:
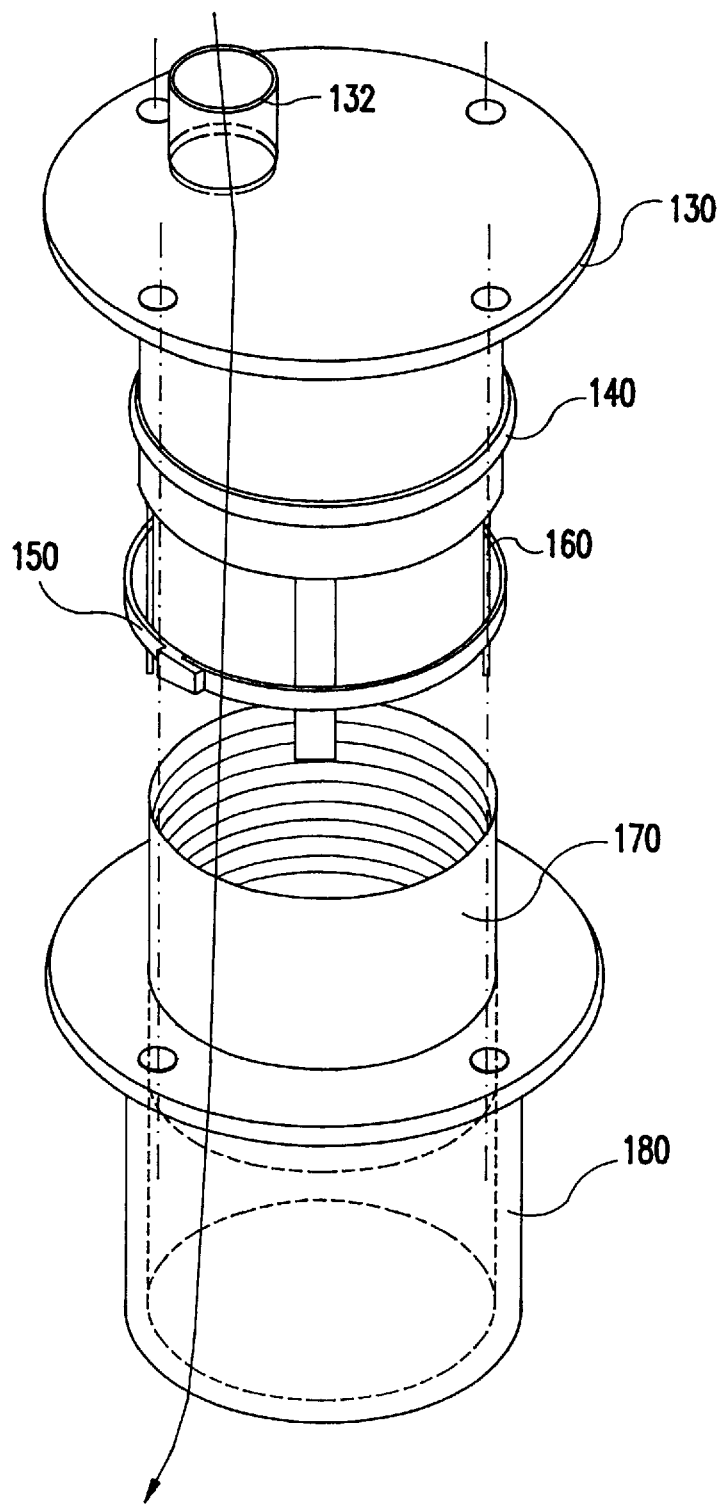
FIG. 3 is a partially exploded perspective view of a filtering portion of the gas scrubber according to an embodiment of the present invention.

Referring to FIG. 3, reference numeral 130 denotes a flange, reference numeral 132 denotes a gas inlet, reference numeral 140 denotes a sealing ring, reference numeral 150 denotes a clamp, reference numeral 160 denotes pillar type filter supporters, reference numeral 170 denotes a cup-shaped filter, and reference numeral 180 denotes a hollow housing.

The gas inlet 132 is protruded from the upper surface of the flange 130, for receiving powder and vapor which are generated by the reaction of silane ($SiH_4$) and $O_2$, and the unreacted used gas. The pillar type filter supporters 160 for maintaining the shape of the filter 170 are installed on the lower surface of the flange 130.

The filter 170 is fixed to the pillar type filter supporters 160 by the clamp 150. At this time, the filter 170 maintains a full cup shape due to the pillar type filter supporters 160, i.e., the filter 170 is not crushed.

The hollow housing 180 is combined with the flange 130 by the sealing ring 140 which is interposed therebetween. The filter 170 is housed inside the hollow housing 180.

The powder and used gas introduced through the gas inlet 132 are passed through the filter 170 in the housing 180 and then discharged through the opening at the bottom of hollow housing 180, as indicated by the arrow in FIG. 3.

Here, the powder and used gas are filtered by passing from the interior of filter 170 to the exterior thereof. Therefore, the filtered powder is collected on the inner wall of the filter 170.

The filtering portion of the gas scrubber and the filtering method according to the embodiment of the present invention has the following advantages.

First, since the width of the entrance portion of the filter 170 is the same as that of other portions thereof, there is no accumulation of powder at the entrance of the filter 170.

Second, since the pillar type filter supporters 160 prevent the crushing of the filter 170, the area where a filtering process is performed is easily secured so that the use of the filter 170 can be prolonged.

Figure 4:
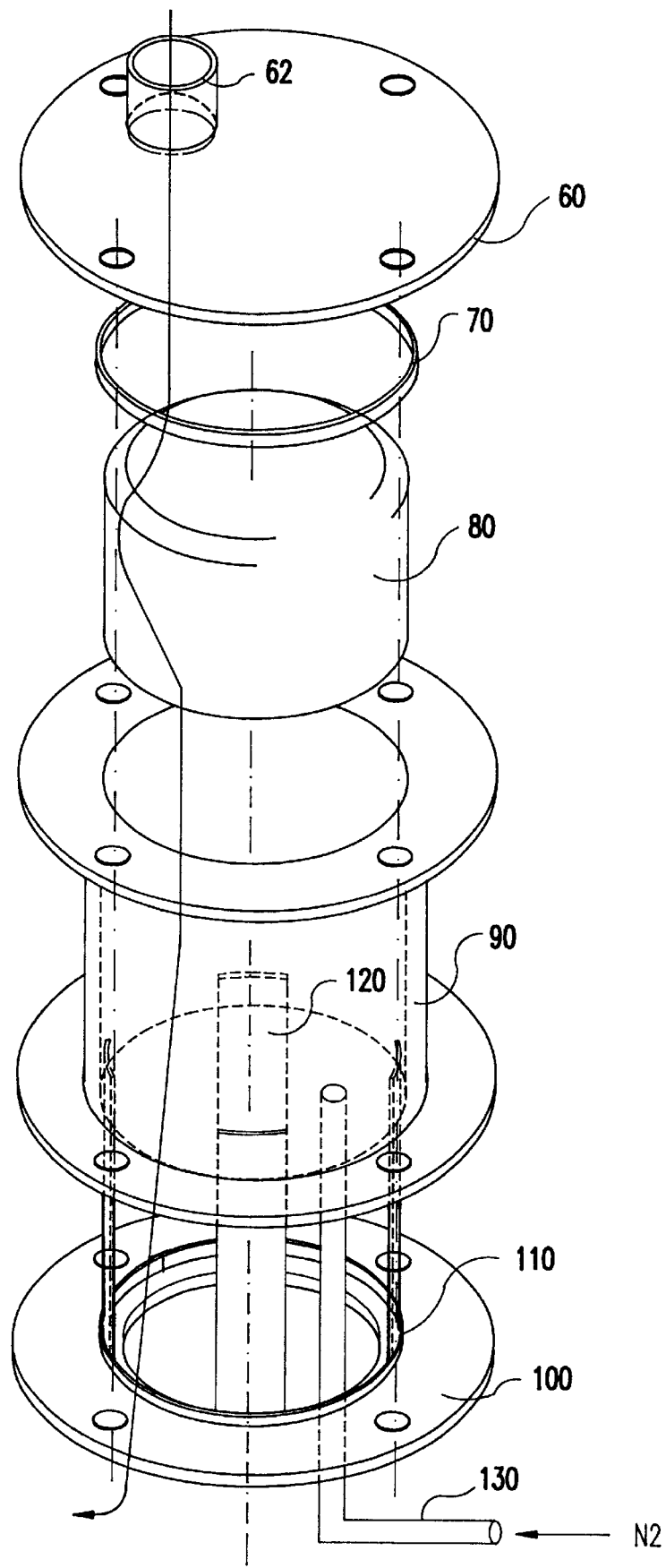
FIG. 4 is an exploded perspective view of a filtering portion of the gas scrubber according to another embodiment of the present invention.

FIG. 4 is a perspective view of a filtering portion of a gas scrubber according to another embodiment of the present invention. Here, reference numeral 60 denotes a first flange, is reference numeral 62 denotes a gas inlet, reference numeral 70 denotes a sealing ring, reference numeral 80 denotes a cap-shaped filter, reference numeral 90 denotes a hollow housing, reference numeral 100 denotes a second flange, reference numeral 110 denotes a clamp, and reference numeral 120 denotes pillar type filter supporters.

The gas inlet 62 is protruded from the upper surface of the first flange 60. The gas inlet 62 is for receiving silicon dioxide powder and vapor which are generated by the reaction of silane ($SiH_4$) with air, and unreacted $SiH_4$.

The hollow housing 90, being made of stainless steel, is located at the lower part of the first flange 60 and combined at one end with the first flange 60 for protecting the filter 80 housed therein.

The first flange 60 is sealed to the hollow housing 90 by the sealing ring 70 which is interposed therebetween. The sealing ring 70 is used for buffering minor impacts generated when combining the first flange 60 to the hollow housing 90 and preventing the leakage of gas therebetween.

The filter 80 has a uniform width and is formed in the shape of a cap. Here, the filter 80 is installed in the hollow housing 90 to filter the powder generated by the reaction of the used gas with air.

The filter 80 maintains its shape due to the pillar type filter supporters 120 installed on the upper surface of the second flange 100 whose outer circumferential surface is combined with the bottom end of the hollow housing 90. Here, the filter 80 is fixed to the pillar type filter supporters 120 by the clamp 110.

Though a portion of the filter 80 is temporarily crushed by insertion into the hollow housing 90, the filter 80 is then completely spread out by the pillar type filter supporters 120. Accordingly, the area in which the filtering process is performed is larger than that of the conventional technology.

A filtering method according to the present invention will be described with reference to the filtering portion of the gas scrubber shown in FIG. 4.

The powder passes through the first flange 60 via the gas inlet 62 and then flows into the hollow housing 90 (see the arrow of FIG. 4) is filtered while passing from the outer wall to the inner wall of the filter 80. Then the filtered flow of gases is discharged from the bottom of the hollow housing 90.

The powder filtered by the filter 80, unlike in the conventional art and unlike in the embodiment shown in FIG. 3, is collected on the outer wall of the filter 80. Such an accumulation of powder can easily be removed by a powder removing unit 130 such as a vibrator or a nitrogen purger provided inside the hollow housing 90.

At this time, the vibrator separates the accumulated powder from the outer wall by vibrating the filter 80. The nitrogen purger removes the powder from the filter 80 with strong nitrogen pressure (i.e., a pressure generated due to the effusion of nitrogen).

Thus, according to the filtering portion of the gas scrubber of the present invention and the filtering method using the same, since the width of the entrance of the filter 80 is equal to that of the other portions, there is no accumulation of powder at the entrance of the filter to thereby prevent the shortening of the life of the filter.

Further, since the filter is prevented from being crushed by means of the pillar type filter supporters 120, a larger effective surface area for the filtering operation can be secured, thereby extending the life of the filter.

Also, since the powder flowing into the hollow housing 90 is filtered by passing from the exterior of the filter 80 to the interior thereof, the filtered powder accumulates on the filter's outer wall. Therefore, it is easy to remove the powder, e.g., by periodically jarring the outer wall, thereby prolonging the life of the filter.

Though the above description of the present invention refers to silane as the gas to be scrubbed, the filtering process can be conducted with other gases; and it is apparent to those skilled in the art that the effects thereof are not changed.

Also, the present invention is not limited to the embodiments; and it is apparent that various changes may be effected by those skilled in the art within the technical spirit as defined by the appended claims.

What is claimed is:

1. A gas scrubber used in fabricating semiconductor devices comprising:

a flange having an inlet on an upper surface thereof;

a hollow cylindrical housing, combined at one end with an outer circumferential surface of said flange;

a cup-shaped filter, housed entirely within said hollow cylindrical housing, for filtering impurities flowing into said filter through said inlet; and pillar type filter supporters mounted on a lower surface of said flange, said pillar filter supporters having distal ends extending into and contacting an inner surface of said filter for maintaining the shape of said filter.

2. A gas scrubber used in fabricating semiconductor devices as claimed in claim 1, further comprising a sealing ring, provided between said flange and said hollow housing, for preventing leakage of said impurities therebetween.

3. A gas scrubber used in fabricating semiconductor devices as claimed in claim 1, further comprising a clamp for fixing said filter to said pillar filter supporters.

4. A gas scrubber used in fabricating semiconductor devices as claimed in claim 1, wherein said impurities which flow through said inlet in said flange and are filtered by said cup-shaped filter comprise used gases and powders generated by the reaction of the used gases with air.

5. A gas scrubber used in fabricating semiconductor devices comprising:

a first flange having a gas inlet on an upper surface thereof;

a hollow housing combined at one end with an outer circumferential surface of said first flange;

a second flange having an outer circumferential surface combined with the other end of said hollow housing;

a cap-shaped filter housed inside said hollow housing, for filtering impurities flowing through said inlet; and pillar filter supporters mounted on an upper surface of said second flange, for maintaining the shape of said filter.

6. A gas scrubber used in fabricating semiconductor devices as claimed in claim 5, further comprising a sealing ring, provided between said first flange and said hollow housing, for preventing leakage of said impurities therebetween.

7. A gas scrubber used in fabricating semiconductor devices as claimed in claim 5, further comprising a clamp for fixing said filter to said pillar filter supporters.

8. A gas scrubber used in fabricating semiconductor devices as claimed in claim 5, wherein said impurities which flow through said inlet in said first flange and are filtered by said cap-shaped filter comprise used gases and powders generated by the reaction of the used gases with air.

9. A gas scrubber used in fabricating semiconductor devices as claimed in claim 5, further comprising powder removing means, installed within said hollow housing, for removing powders accumulated on an outer surface of said filter.

10. A gas scrubber of a semiconductor device as claimed in claim 9, wherein said powder removing means is a nitrogen purger for providing nitrogen pressure into said filter.

11. A method for filtering impurities from a gas stream, comprising:

flowing impurities into a hollow housing through a gas inlet located near an upper end of a cup-shaped filter housed in the hollow housing; and filtering the impurities by passing the same from an interior of the cup-shaped filter to an exterior thereof.

* * * * *